(12) United States Patent
Xiao et al.

(10) Patent No.: US 8,275,546 B2
(45) Date of Patent: Sep. 25, 2012

(54) TRAVELOGUE-BASED TRAVEL ROUTE PLANNING

(75) Inventors: Rong Xiao, Beijing (CN); Jiangming Yang, Beijing (CN); Lei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/568,725

(22) Filed: Sep. 29, 2009

(65) Prior Publication Data
US 2011/0077848 A1 Mar. 31, 2011

(51) Int. Cl.
*G01C 21/34* (2006.01)
(52) U.S. Cl. ............. 701/533; 701/411; 340/995.19
(58) Field of Classification Search .............. None
See application file for complete search history.

(56) References Cited

U.S. PATENT DOCUMENTS

| | | | |
|---|---|---|---|
| 6,182,008 B1 * | 1/2001 | Nikiel et al. ............ 701/467 |
| 6,321,158 B1 * | 11/2001 | DeLorme et al. ......... 701/426 |
| 7,379,811 B2 | 5/2008 | Rasmussen et al. |
| 7,463,976 B2 | 12/2008 | Nomura |
| 7,472,338 B2 | 12/2008 | Carro |
| 7,475,010 B2 | 1/2009 | Chao |
| 7,548,915 B2 | 6/2009 | Ramer et al. |
| 7,698,332 B2 | 4/2010 | Liu et al. |
| 7,734,641 B2 | 6/2010 | Kanigsberg |
| 7,788,134 B1 | 8/2010 | Manber et al. |
| 8,095,303 B1 * | 1/2012 | Nesbitt et al. ............ 701/426 |
| 2002/0128767 A1 | 9/2002 | Cardno et al. |
| 2002/0143490 A1 | 10/2002 | Maeda et al. |
| 2003/0093217 A1 | 5/2003 | Petzold et al. |
| 2004/0059708 A1 | 3/2004 | Dean et al. |
| 2005/0216464 A1 | 9/2005 | Toyama et al. |
| 2005/0234991 A1 | 10/2005 | Marx et al. |
| 2005/0278378 A1 | 12/2005 | Frank |
| 2006/0047690 A1 | 3/2006 | Humphreys et al. |
| 2006/0230033 A1 | 10/2006 | Halevy et al. |
| 2007/0005419 A1 | 1/2007 | Horvitz et al. |
| 2007/0010942 A1 | 1/2007 | Bill |
| 2007/0150188 A1 | 6/2007 | Rosenberg |
| 2007/0179863 A1 | 8/2007 | Stoll |
| 2007/0198182 A1 | 8/2007 | Singh |
| 2007/0219968 A1 | 9/2007 | Frank |
| 2008/0010605 A1 | 1/2008 | Frank |
| 2008/0033903 A1 | 2/2008 | Carol et al. |
| 2008/0082578 A1 | 4/2008 | Hogue et al. |

(Continued)

OTHER PUBLICATIONS

Roger, et at., "An Adaptive Interactive Agent for Route Advice", Retrieved at <<http://citeseerx.ist.psu.edu/viewdoc/download-?doi=10.1.1.29.3759&rep=rep1&type=pdf>> In the Proceedings of the third annual conference on Autonomous Agents, 1999, pp. 8.

(Continued)

*Primary Examiner* — Michael J. Zanelli
(74) *Attorney, Agent, or Firm* — Hope Baldauff Hartman, LLC

(57) ABSTRACT

A location extraction component analyzes a set of travelogues to identify locations mentioned therein. A co-occurrence extraction component computes co-occurrence values for the identified locations. When a request to generate a travel route from a starting location to an ending location is received, suggested locations on or near the travel route are identified through the use of the co-occurrence values. A suggested travel route is then generated that passes through the starting location, the ending location, and the suggested locations. A map may be displayed showing the starting location, the ending location, the suggested locations, and the suggested travel route.

20 Claims, 7 Drawing Sheets

U.S. PATENT DOCUMENTS

| | | | |
|---|---|---|---|
| 2008/0086468 | A1 | 4/2008 | Jing et al. |
| 2008/0086686 | A1 | 4/2008 | Jing et al. |
| 2008/0125969 | A1 | 5/2008 | Chen et al. |
| 2008/0319974 | A1 | 12/2008 | Ma et al. |
| 2009/0005981 | A1 | 1/2009 | Forstall et al. |
| 2009/0019066 | A1 | 1/2009 | Wang et al. |
| 2009/0070297 | A1 | 3/2009 | Hadzima et al. |
| 2009/0119255 | A1 | 5/2009 | Frank et al. |
| 2009/0156229 | A1 | 6/2009 | Hein et al. |
| 2010/0179754 | A1 | 7/2010 | Faenger et al. |
| 2011/0072025 | A1 | 3/2011 | Van Zwol et al. |
| 2011/0078139 | A1 | 3/2011 | Xiao et al. |
| 2011/0078575 | A1 | 3/2011 | Xiao et al. |
| 2011/0252025 | A1 | 10/2011 | Jin et al. |
| 2011/0264655 | A1 | 10/2011 | Xiao et al. |
| 2011/0264664 | A1 | 10/2011 | Xiao et al. |
| 2011/0271232 | A1 | 11/2011 | Crochet et al. |

OTHER PUBLICATIONS

Edge, et al., "Web User Experience", Retrieved at <<http://research.microsoft.com/en-us/projects/wue/>> Aug. 7, 2009, p. 1-2.

"Geographic Information System", Retrieved at <<http://en.wikipedia.org/wiki/GIS>>, Aug. 6, 2009, pp. 1-18.

"Road Trip, Retrieved" at <<http://download.microsoft.com/download/2/4/b/24bb8c05-8bd4-4cac-89ff-0901bf3b8468/RoadTrip.doc>> p. 1.

"Microsoft Streets & Trips 2001 Planning a Road Trip", Retrieved at <<http://www.webjunction.org/c/document_library/get_file?folderId=431408&name=DLFE-10121.pdf>> 2001, pp. 147-154.

"Shortest Path Problem", Retrieved at <<http://en.wikipedia.org/wiki/Shortest_path>> Aug. 7, 2009, pp. 1-4.

"Travelling Salesman Problem" Retrieved at <<http://en.wikipedia.org/wiki/Traveling_salesman_problem>> Aug. 7, 2009, pp. 8.

Amitay, et al., "Web-A-Where: Geotagging Web Content", Retrieved at <<<http://einat.webir.org/SIGIR_2004_GeoMiner_p273-amitay.pdf>> Proceedings of the 27th annual international ACM SIGIR conference on Research and development in information retrieval, Jul. 25-29, 2004, Sheffield, South Yorkshire, UK., pp. 273-280.

"Bootsnall", Retrieved at <<http://www.bootsnall.com>>, Aug. 7, 2009, pp. 2.

"Expedia", Retrieved at <<http://www.expedia.com>>, Expedia Travel: Cheap Flights, Hotels, Car Rental, Airfare, Cruise, and Vacations, Aug. 7, 2009, pp. 2.

"Getjealous", Retrieved at <<http://www.getjealous.com>> GetJealous.com Travel Blogs, Aug. 7, 2009, pp. 2.

Leidner, et al., "Grounding Spatial Named Entities for Information Extraction and Question Answering" Retrieved at <<http://citeseerx.ist.psu.edu/viewdoc/download?doi=10.1.1.4.3786&rep=rep1&type=pdf>> In the Proceedings of the HLT-NAACL 2003 workshop on Analysis of geographic references—vol. 1, 2003, pp. 8.

Li, et al., "Location Normalization for Information Extraction", Retrieved at <<http://www.aclweb.org/anthology/C/CO2/C02-1127.pdf>> In the Proceedings of the 19th international conference on Computational linguistics, 2002, pp. 7.

Li, et al., "Infoxtract Location Normalization: A Hybrid Approach to Geographic References in Information Extraction", Retrieved at <<http://acl.ldc.upenn.edu/W/W03/W03-0106.pdf>> In the Proceedings of the HLT-NAACL 2003 workshop on Analysis of geographic references—vol. 1, 2003, pp. 6.

Ma, et al., "A Localness-Filter for Searched Web Pages", Retrieved at <<http://www.springerlink.com/content/pkm5r1yv1jd2hw7m/fulltext.pdf>> X. Zhou, Y. Zhang, and M.E. Orlowska (Eds.): APWeb 2003, LNCS 2642, pp. 525-536, 2003, vol. 2642, 2003, pp. 525-536.

McCurley, Kevin S., "Geospatial Mapping and Navigation of the Web", Retrieved at <<http://delivery.acm.org/10.1145/380000/372056/p221-mccurley.pdf?key1=372056&key2=2726369421&coll=GUIDE&dl=GUIDE&CFID=46700166&CFTOKEN=58855283>> In the Proceedings of the 10th international conference on World Wide Web, May 1-5, 2001, Hong Kong, pp. 221-229.

Rauch, et al., "A Confidence-Based Framework for Disambiguating Geographic Terms", Retrieved at <<http://delivery.acm.org/10.1145/1120000/1119402/p50-rauch.pdf?key1=1119402&key2=9416369421&coll=GUIDE&dl=GUIDE&CFID=46700009&CFTOKEN=96529354>> In the Proceedings of the HLT-NAACL 2003 workshop on Analysis of geographic references, 2003, pp. 50-54.

"Realtravel", Retreived at <<http://www.realtravel.com>> Travel reviews & deals for vacations, hotels, resorts—Real Travel, Aug. 7, 2009, pp. 3.

"Travelblog", Retreived at <<http://www.travelblog.org>> Travel Blogs, Photos, Videos and Maps, Aug. 7, 2009, pp. 4.

"Traveljournals", Retrieved at <<http://www.traveljournals.net>> Traveljournals.net—Stories from your friends on the road, Aug. 7, 2009, p. 1.

"Travelpod", Retreived at <<http://www.travelpod.com>> Free Travel Blog to Share your Trips—TravelPod, Aug. 7, 2009, pp. 1-4.

"Travelpost", Retreived at <<http://www.travelpost.com>> Hotel Reviews | Hotel Ratings | Resort Reviews | TravelPost.com, Aug. 7, 2009, p. 1.

Wang, et al., "Detecting Geographic Locations from Web Resources", Retrieved at <<http://delivery.acm.org/10.1145/1100000/1096991/p17-wang.pdf?key1=1096991&key2=5065369421&coll=GUIDE&dl=GUIDE&CFID=47917983&CFTOKEN=38473394>> Proceedings of the 2005 workshop on Geographic information retrieval, 2005, pp. 17-24.

Wang, et al., "Web Resource Geographic Location Classification and Detection", Retrieved at <<http://www2005.org/cdrom/docs/p1138.pdf>> Special interest tracks and posters of the 14th international conference, May 10-14, 2005, pp. 1138-1139.

"Yahoo! Placemaker™ Beta" retrieved at <<http://developer.yahoo.com/geo/placemaker/>>, pp. 2.

"Embed Google Maps on your Website or Blog," Sep. 5, 2007, Retrieved from http://www.labnol.org/internet/blogging/embed-google-maps-on-your-website-or-blog/1316/, 1 page.

Free Geography Tools, Jul. 19, 2007, pp. 1-10.

"GeoSense Mobility Complete Mobile Workforce Management Platform," Retrieved Aug. 11, 2009 from http://enovia.ca/site/GeoSenseMobility.php, pp. 3.

"Inserting HTML Code into your Web Site," Retrieved Aug. 11, 2009 from http://office.microsoft.com/en-us/officelive/FX102223081033.aspx?mode=print, 6 pages.

"Road Trip," Retrieved Aug. 6, 2009 from http://download.microsoft.com/download/2/4/b/24bb8c05-8bd4-4cac-89ff-0901bf3b8468/RoadTrip.doc, 1 Page.

"Traveljournals," Retrieved Aug. 7, 2009 from http://www.traveljournals.net, 1 page.

"Travelogue," Retrieved Aug. 6, 2009 from http://sourceforge.net/projects/travelogue/, 1 page.

Brunato et al., "A Location-dependent Recommender System for the Web," 2002, *Technical Report DIT-02-093, Ingengneria e Scienca dell'Informazione*, University of Trento, Italy, 5 pages.

Cucerzan, "Large-scale Named Entity Disambiguation Based on Wikipedia Data," Jun. 2007, *Proceedings of the 2007 Joint Conf. on Empirical Methods in Natural Language Processing and Computational Natural Language Learning*, pp. 708-716.

Ardissono et al. "Tailoring the Recommendation of Tourist Information to Heterogeneous User Groups," 2002, *Proceedings, Revised Papers from the International Workshops OHS-7, SC-3, and AH-3 on Hypermedia: Openness, Structural Awareness, and Adaptivity*, pp. 280-295.

Hassell, IV "Ontology-driven Automatic Entity Disambiguation in Unstructured Text," 2006, Thesis, University of Georgia, 96 pages.

Martens, "On Usability of Web Services," Dec. 13, 2003, *Proceedings of 4th Int'l Conference on Web Information Systems Engineering Workshops*, pp. 182-190.

Mior, "Rapid Prototyping of a Mobile Location-based Tour," Dec. 12, 2008, Thesis, University of Ontario Institute of Technology, 22 pages.

Moxley, "SpiritTagger: A Geo-Aware Tag Suggestion Tool Mined from Flickr," 2008, pp. 24-30.

Overell et al., "Geographic Co-occurrence as a Tool for GIR," Nov. 9, 2007, *ACM*, 6 pages.

Park et al., "Location-based Recommendation System Using Bayesian User's Preference Model in Mobile Devices," 2007, *Lecture Notes in Computer Science*, vol. 4611/2007, pp. 1130-1139.

Pouliquen et al., "Geographical Recognition and Visualization in Texts Written in Various Languages," Mar. 14-17, 2004, *ACM Symposium on Applied Computing*, 8 pages.

Ricci, "Travel Recommender Systems," Nov./Dec. 2002, *IEEE Intelligent Systems*, 17(6): 55-57.

Silvia et al., "Adding Geographic Scopes to Web Resources," 2004, *Workshop on Geographic Information Retrieval*, Sheffield, UK, 3 pages.

Sundheim, "Resources to Facilitate Progress in Place Name Identification and Reference Resolution," 2002, *Proceedings of the 2nd Int'l Conference on Human Language Technology Research*, pp. 319-324.

Takeuchi et al., "An Outdoor Recommendation System based on User Location History," 2005, ubiPCMM, 10 pages.

Wang et al., "Application-Driven Web Resource Location Classification and Detection," Mar. 2005, retrieved from http://research.microsoft.com/pubs/70152/tr-2005-32.pdf, 10 pages.

Wang et al., "Detecting Dominant Locations from Search Queries," 2005, *Proceedings of SIGR Conference on Research and Development in Information Retrieval*, pp. 424-431.

Zheng et al., "Mining Interesting Locations and Travel Sequences from GPS Trajectories," Apr. 20-24, 2009, *Proceedings of the 18th Int'l Conference on World Wide Web*, Madrid, Spain, pp. 791-800.

U.S. Official Action dated Dec. 19, 2011 in U.S. Appl. No. 12/568,735.

U.S. Official Action dated Mar. 26, 2012 in U.S. Appl. No. 12/568,749.

U.S. Official Action dated Feb. 29, 2012 in U.S. Appl. No. 12/764,989.

U.S. Notice of Allowance dated May 23, 2012 in U.S. Appl. No. 12/568,735.

U.S. Official Action dated Mar. 30, 2012 in U.S. Appl. No. 12/764,977.

Jing et al., "VirtualTour: An Online Travel Assistant Based on High Quality Images," Oct. 23-27, 2006, MM'06, SantaBarara, California, 4 pages.

* cited by examiner

TRAVELOGUE-BASED TRAVEL ROUTE PLANNING

BACKGROUND

Travelers frequently utilize World Wide Web (the "Web") sites to assist them with travel planning One of the most common uses of such Web sites is in identifying a driving route between a starting location and an ending location. Using such a site, a user provides the identities of the starting and ending locations. In turn, the Web site computes the shortest travel route between the two locations and provides the identified travel route to the user. Alternately, the Web site might compute the fastest travel route between the two locations using criteria such as whether the possible travel routes include highways, the speed limit for the roads on possible routes, and other factors.

Many travelers are only interested in the shortest or fastest travel route between two locations. Some travelers, however, are interested in learning about locations of interest that are on or near the shortest or fastest travel route between two locations. This type of traveler might be interested in learning about an alternative travel route that takes longer to drive than the shortest or fastest travel route if the alternative travel route includes locations of interest. Unfortunately, current Web sites and software-based travel tools do not provide such functionality. As a result, it can be difficult for travelers to identify locations of interest on or near a shortest or fastest travel route between two locations.

It is with respect to these and other considerations that the disclosure made herein is presented.

SUMMARY

Concepts and technologies are described herein for travelogue-based travel route planning. Through an implementation of the concepts and technologies presented herein, functionality can be provided for assisting a user in planning a travel route that passes through a starting and ending location, and that also passes through or near popular points of interest. In this way, a traveler can easily and quickly identify a travel route that might be more interesting to travel than the shortest or fastest route.

According to one aspect presented herein, travelogues are utilized to identify locations along a shortest or fastest travel route between two locations that might be of interest to a traveler. Travelogues are textual descriptions of a person's experience with a particular location. For instance, a person might travel to New York City and write a travelogue that describes their travel experience. In addition to a description of the person's travel experience with a particular location, a travelogue might also include a description of the person's experience with other, related locations. As an example, a travelogue regarding New York City might also include information regarding other nearby locations, like Brooklyn. Such a travelogue might also include information regarding tourist attractions, restaurants, shopping destinations, and other locations in or near New York City.

The travelogues are first retrieved from a variety of travelogue sites and stored. For instance, travelogues might be retrieved from Web sites, Web forums, blog sites, social networking sites, and other types of sites. Once the travelogues have been obtained and stored, a location extraction component is executed that analyzes the travelogues to identify locations mentioned therein. The location extraction component might utilize a gazetteer containing location names in order to identify locations mentioned in the set of travelogues. For instance, the gazetteer might be utilized to identify possible name candidates, a classifier might then be utilized to identify location names from the candidates, and ambiguity resolution might then be performed to distinguish between different locations that have the same name.

After the locations mentioned in the set of travelogues have been identified, a co-occurrence extraction component is executed that computes co-occurrence values for the identified locations. Each co-occurrence value is an integer value that specifies the number of times two locations are mentioned in the same travelogue for the entire set of travelogues. Co-occurrence values are, therefore, computed for pairs of identified locations. The co-occurrence values are then stored for use in identifying suggested travel routes.

In one embodiment, a request is received to generate a travel route. For instance, a request may be received to generate a travel route from a starting location to an ending location. In response to receiving such a request, a first travel route is generated between the starting location and the ending location. The first travel route may be generated using a shortest path algorithm, a fastest path algorithm, or using another type of algorithm.

Once the first travel route has been generated, suggested locations on or near the first travel route are identified using the co-occurrence values. In particular, the suggested locations are identified in one embodiment by identifying locations on the first travel route. For each of the locations identified on the first travel route, one or more suggested locations are identified. The suggested locations are those locations having a non-zero co-occurrence value with the locations identified on the first travel route. The suggested locations may be filtered in order to eliminate those suggested locations that are more than a threshold distance away from the first travel route.

Once the suggested locations have been identified, a suggested travel route is computed that passes through the starting location, the ending location, and the suggested locations. In one implementation, the suggested travel route is computed utilizing a traveling salesman algorithm. Other algorithms may be utilized in other embodiments. In one embodiment, a map is displayed to a user that shows the starting location, the ending location, the suggested locations, and the suggested travel route.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
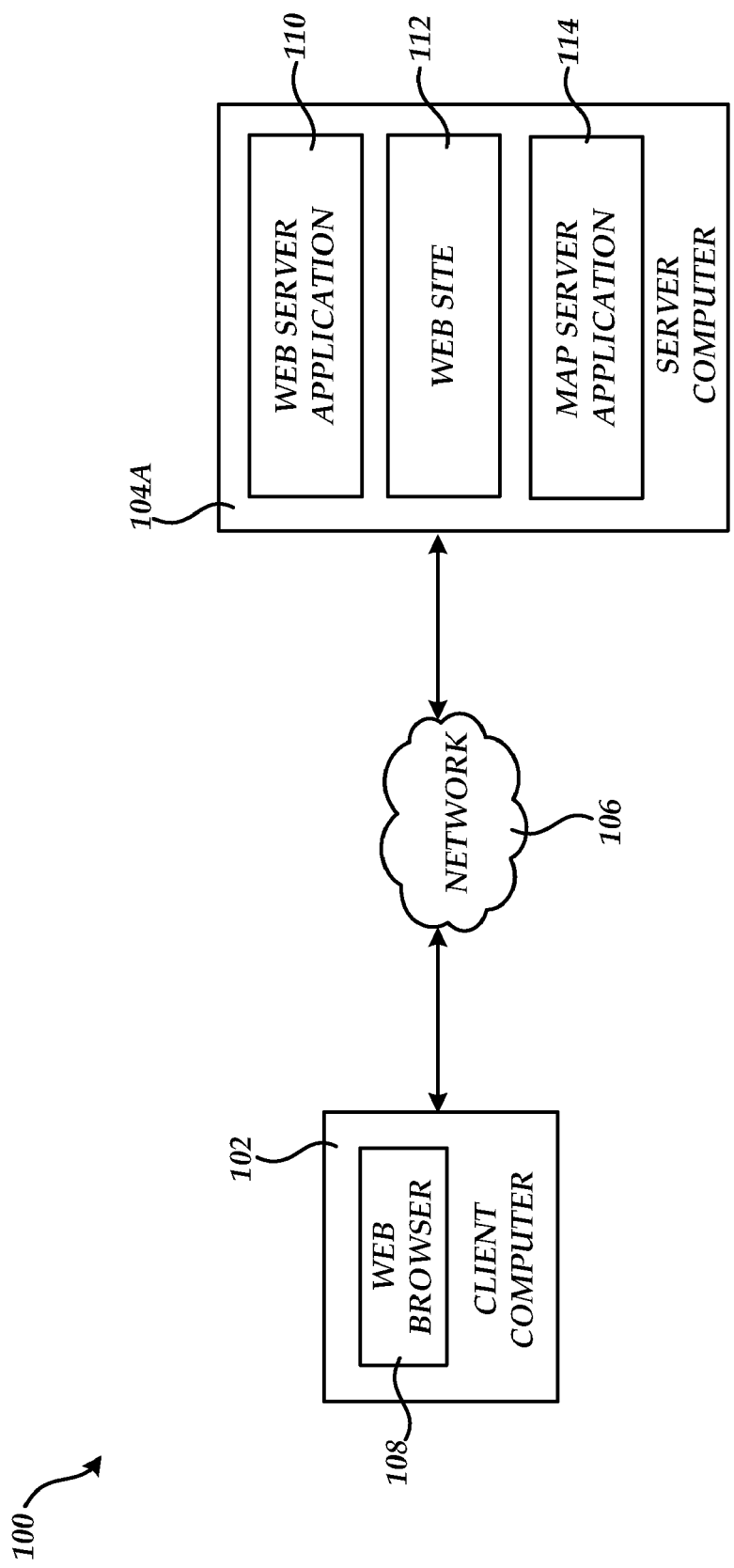
FIGS. 1 and 2 are system diagrams illustrating aspects of one operating environment for the various embodiments presented herein.

The following detailed description is directed to technologies for travelogue-based travel route planning. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for travelogue-based travel route suggestion will be presented.

Referring now to FIG. 1, aspects of one operating environment for the various embodiments presented herein will be described. The operating environment shown in FIG. 1 includes a system 100 having a client computer 102 and a server computer 104A therein that are communicatively coupled via a network 106. In the embodiments presented herein, the network 106 comprises the Internet. It should be appreciated, however, that other types of local and wide area networks may be utilized to interconnect the client computer 102 and the server computer 104A.

It should also be appreciated that although a single client computer 102 and a single server computer 104A have been illustrated in FIG. 1, many such client computers 102 may be utilized in conjunction with the functionality presented herein and many server computers 104A may be utilized to provide the functionality described herein. In this regard, it should be appreciated that the software components described herein for providing travelogue-based travel route planning may be executed in a distributed fashion among many such server computers 104 interconnected by many such networks 106.

According to one implementation, the server computer 104A is configured to execute a Web server application 110. As known in the art, a Web server application 110 is configured to receive and respond to requests for Web sites, such as the Web site 112, and related content. The Web site 112 is configured to provide the functionality presented herein for travelogue-based travel route planning In particular, a user of the client computer 102 may utilize the Web browser 108 to establish a connection with the Web server application 110 and to connect to the Web site 112.

According to one implementation, the Web site 112 is configured to receive a request to generate a travel route from the user of the client computer 102 via the Web browser 108. For instance, the user of the client computer 102 may specify the identity of a starting location and an ending location for the travel route. As will be described in greater detail below, the Web site 112 is configured to generate a travel route that passes through the starting location, the ending location, and one or more suggested locations that are identified by the Web site 112 in the manner presented herein. Details regarding the processing performed by the Web site 112 in order to provide this functionality will be provided below with respect to FIGS. 2-8.

According to one implementation, the Web site 112 operates in conjunction with a map server application 114 to provide a map showing the suggested travel route. In particular, the Web site 112 may operate in conjunction with the map server application 114 to cause the Web browser 108 to display a map to a user of the client computer 102. The map shows a geographical area that includes the suggested travel route. The starting location, the ending location, the suggested locations, and the suggested travel route may be displayed on the map. Additional details regarding this functionality will also be provided below with respect to FIGS. 2-8.

Figure 2:
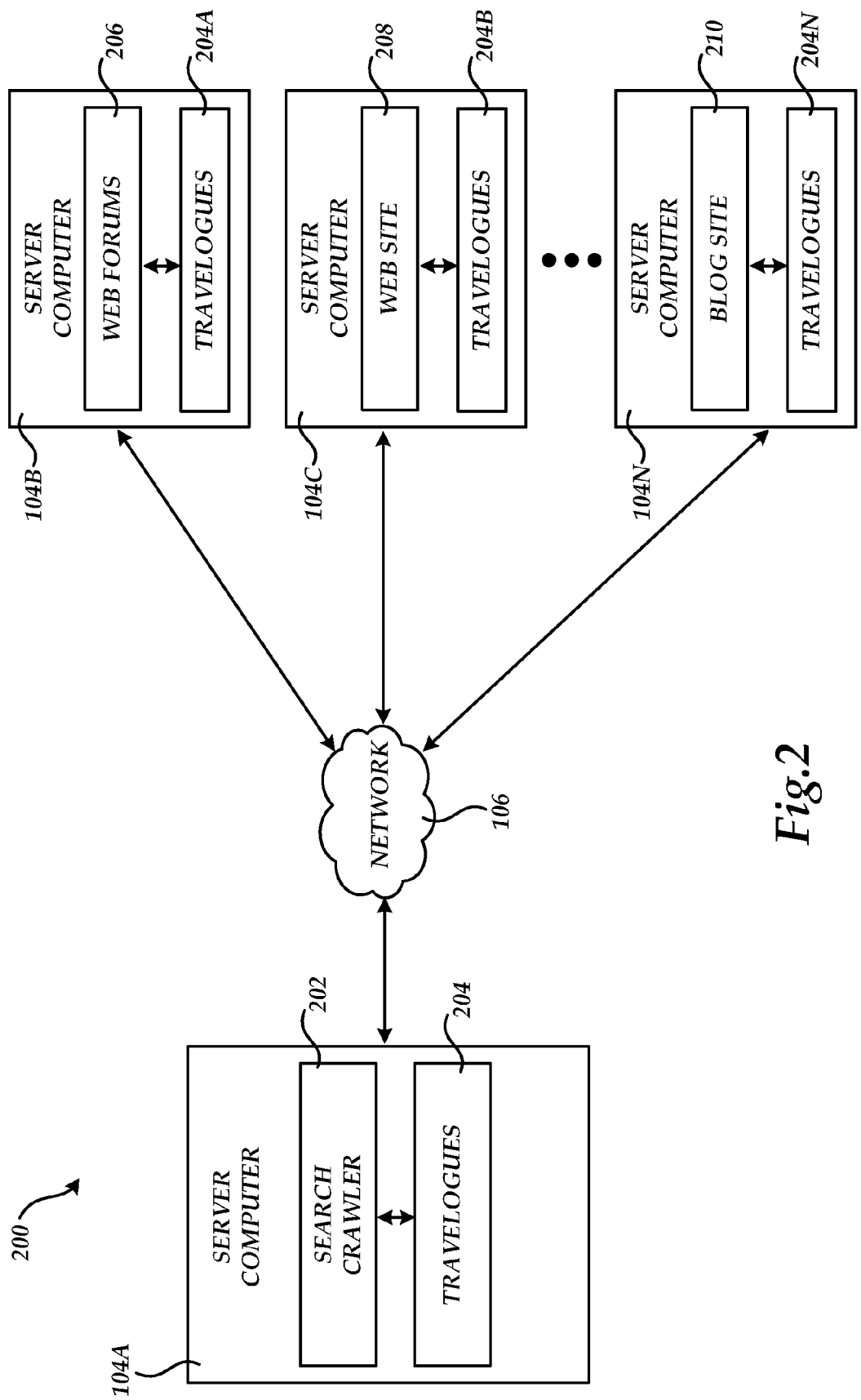

Turning now to FIG. 2, additional aspects of one operating environment for the various embodiments presented herein will be disclosed. As shown in FIG. 2, the server computer 104A may be equipped with a search crawler program 202 that is configured to retrieve information from the server computers 104B-104N. In particular, the search crawler program 202 is configured to crawl sites publically available from the server computers 104B-104N that include travelogues 204A-204N.

As discussed briefly above, travelogues are textual descriptions of a person's experience with a particular location. For instance, a person might travel to New York City and write a travelogue that describes their travel experience. In addition to a description of a person's travel experience with a particular location, a travelogue might also include a description of the person's experience with other, related locations. For instance, a travelogue regarding New York City might also include information regarding other nearby locations like Brooklyn. Such a travelogue might also include information regarding tourist attractions, restaurants, shopping destinations, and other locations in or near New York City.

As known to those skilled in art, travelogues are currently written and shared in a variety of different ways on the Internet. For instance, travelogues can be shared by way of a Web site 208, Web forums 206, a blog site 210, social networking sites, and through the use of other sites made publically available via a network 106, such as the Internet. The search crawler program 202 is configured in one embodiment to crawl the Web forums 206, the Web site 208, and the blog site 210 to identify and retrieve the travelogues 204A-204N, respectively (the travelogues 204A-204N are referred to herein collectively as the travelogues 204). The search crawler program 202 might also be configured to search other types of sites for the travelogues 204.

The search crawler program 202 then stores all or portion of the travelogues 204 at the server computer 104A. As will be discussed in greater detail below, the content of the travelogues 204 can be utilized by the Web site 112 to identify a suggested travel route that includes popular locations. Additional details regarding this process will be provided below with respect to FIGS. 3-8.

Figure 3:
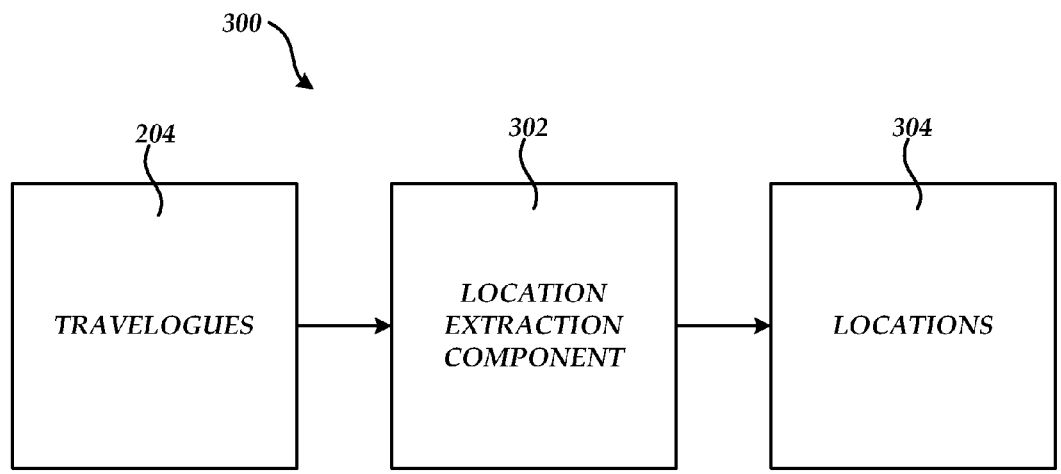
FIG. 3 is a software architecture diagram showing aspects of a software component utilized in one embodiment presented herein for extracting locations from travelogues.

Referring now to FIG. 3, a software architecture diagram showing aspects of one software component utilized in an embodiment presented herein for extracting locations from travelogues will be described. In particular, FIG. 3 illustrates a location extraction component 302 that might be executed by the server computer 104 according to various embodiments presented herein. The location extraction component 302 is an executable software component configured to take the travelogues 204 as input. The location extraction component 302 then analyzes the travelogues 204 to identify the locations 304 mentioned therein. For instance, if one of the travelogues 204 referenced New York City, Brooklyn, Manhattan, Wall Street, and Central Park, the location extraction component 302 would be able to identify these locations 304 through an analysis of the travelogue.

In order to identify locations in the travelogues 204, the location extraction component 302 might utilize a gazetteer that contains location names in order to identify the locations mentioned in the set of travelogues 204. For instance, the gazetteer might be utilized to identify possible name candidates, a classifier might then be utilized to identify location names from the candidates, and ambiguity resolution might then be performed to distinguish between different locations that have the same name.

Figure 4:
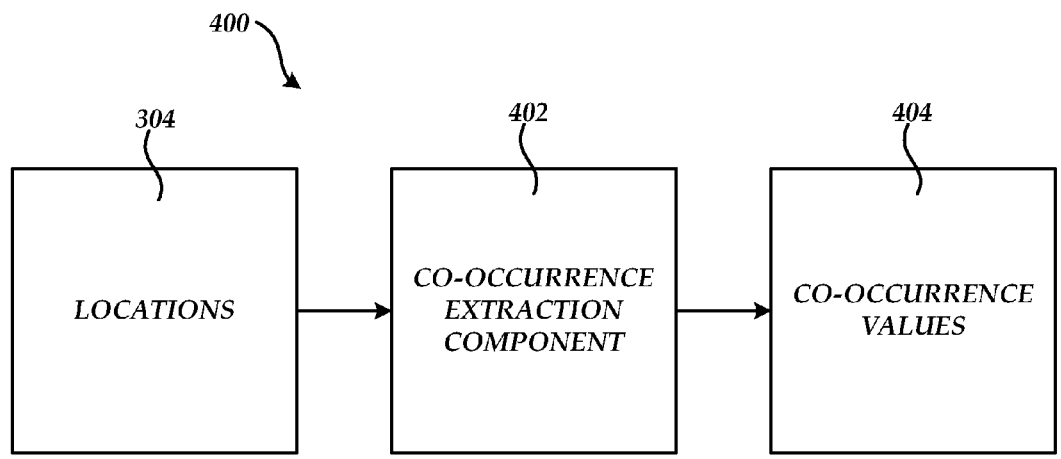
FIG. 4 is a software architecture diagram showing aspects of a software component utilized in one embodiment presented herein for generating co-occurrence values for locations identified in travelogues.

Turning now to FIG. 4, a software architecture diagram showing aspects of a software component utilized in one embodiment presented herein for generating co-occurrence values for locations identified in travelogues will be described. In particular, FIG. 4 illustrates a co-occurrence extraction component 402. The co-occurrence extraction component 402 is also an executable software component that might be utilized by the server computer 104A to provide the functionality described herein for providing travelogue-based travel route planning to a user of the client computer 102.

As illustrated in FIG. 4, the co-occurrence extraction component 402 takes the locations 304 generated by the location extraction component 302 as input. The co-occurrence extraction component 402 then computes co-occurrence values for the identified locations 304. A co-occurrence value is an integer value that specifies the number of times two locations are mentioned in the same travelogue for the entire set of travelogues 204. In order to compute the co-occurrence value, the number of times each pair of locations 304 occurs within the entire set of travelogues 204 is computed by the co-occurrence extraction component 402. The co-occurrence values 404 are then stored for use in identifying a suggested travel route that passes through popular locations in the manner described below.

As will be described in greater detail below, when a request to generate a travel route is received, such as through the submission of such a request to the Web site 112, the Web site 112 is configured to utilize the co-occurrence values 404 to identify popular locations along a travel route. In particular, in one implementation, the Web site 112 first computes a travel route between a starting location and an ending location in a traditional fashion. For instance, a shortest or fastest path computation may be utilized to identify the travel route.

Once the shortest or fastest travel route has been identified between the starting location and the ending location, one or more locations along the travel route are identified. The co-occurrence values are then utilized to identify suggested locations near the locations on the travel route. Suggested locations are those locations having a non-zero co-occurrence value with respect to the locations along the travel route. The suggested locations might be filtered by eliminating those suggested locations from consideration that are more than a predetermined distance away from the shortest or fastest travel route. The suggested locations might also be filtered so that only N suggested locations having the highest co-occurrence values are presented to the user.

Once the suggested locations have been identified, a suggested travel route is generated that passes through the starting location, the ending location, and the suggested locations. The suggested travel route might be generated using a traveling salesman algorithm or another such algorithm known to those skilled in the art. The suggested travel route, including the starting location, ending location, and suggested locations, might then be displayed on a map to the user that supplied the request. Additional details regarding this process will be provided below with respect to FIGS. 5-8.

Figure 5:
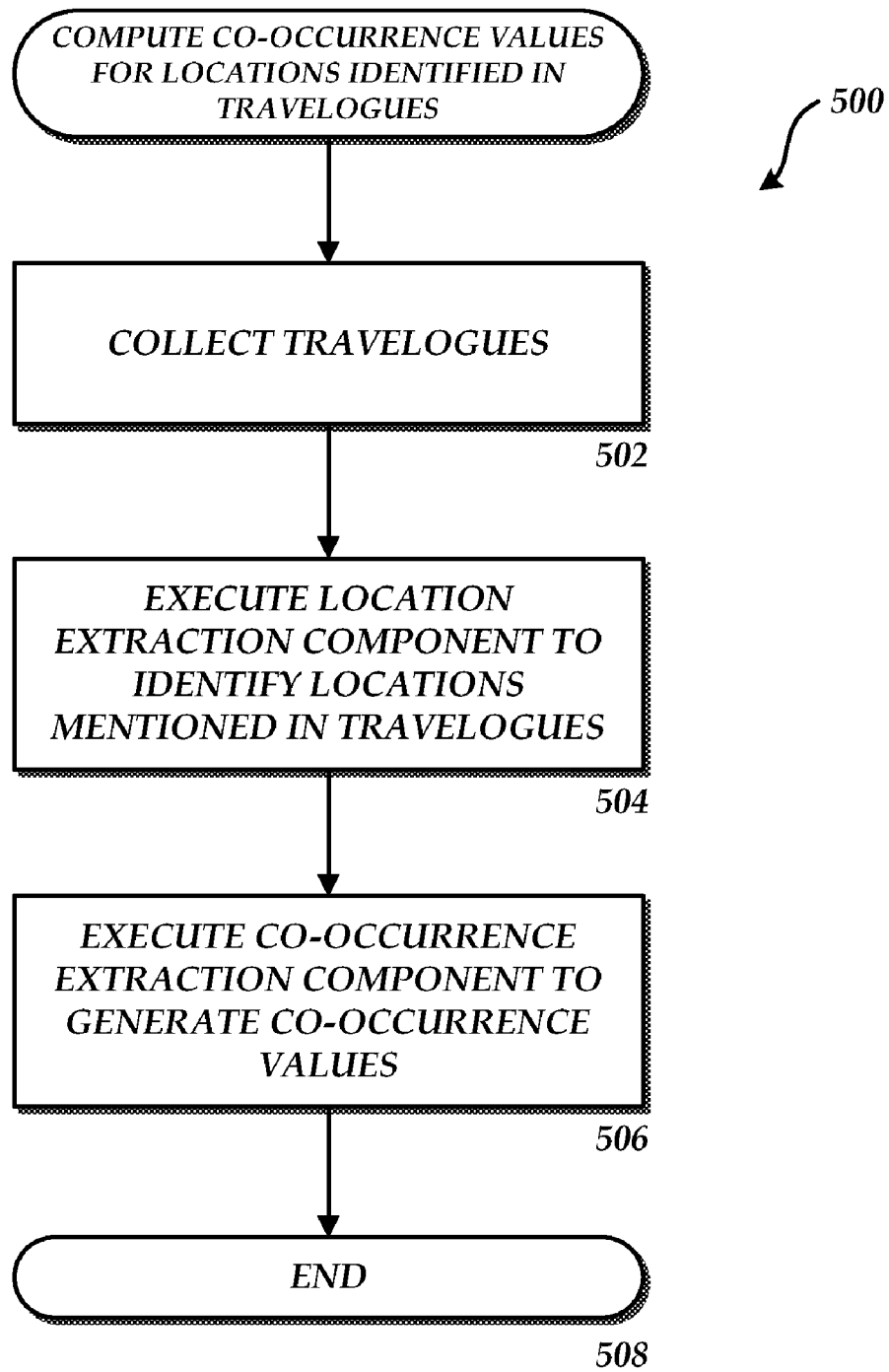
FIG. 5 is a flow diagram showing aspects of one process presented herein for generating co-occurrence values for locations identified in travelogues according to one embodiment presented herein.

Referring now to FIG. 5, additional details will be provided regarding the embodiments presented herein for travelogue-based travel route planning In particular, FIG. 5 is a flow diagram showing a routine 500 that illustrates aspects of one process presented herein for generating co-occurrence values 404 for locations identified in the travelogues 204.

It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the search crawler program 202 collects the travelogues 204 from the server computer 104B-104N. Once the travelogues 204 have been collected, the routine 500 proceeds to operation 504 where the location extraction component 302 is executed. As discussed above, the location extraction component 302 is configured to identify locations 304 that are mentioned in the set of travelogues 204.

Once the location extraction component 302 has completed execution, the routine 500 proceeds to operation 506, where the co-occurrence extraction component 402 is executed. As discussed above with respect to FIG. 4, the co-occurrence extraction component 402 is configured to generate co-occurrence values 404 for each pair of locations 304 identified within the travelogues 204. Once the co-occurrence extraction component 402 has completed execution, the routine 500 proceeds to operation 508, where it ends. As mentioned above, the co-occurrence values 404 may be made available to the Web site 112 for use in the processes presented herein for travelogue-based travel suggestion.

Figure 6:
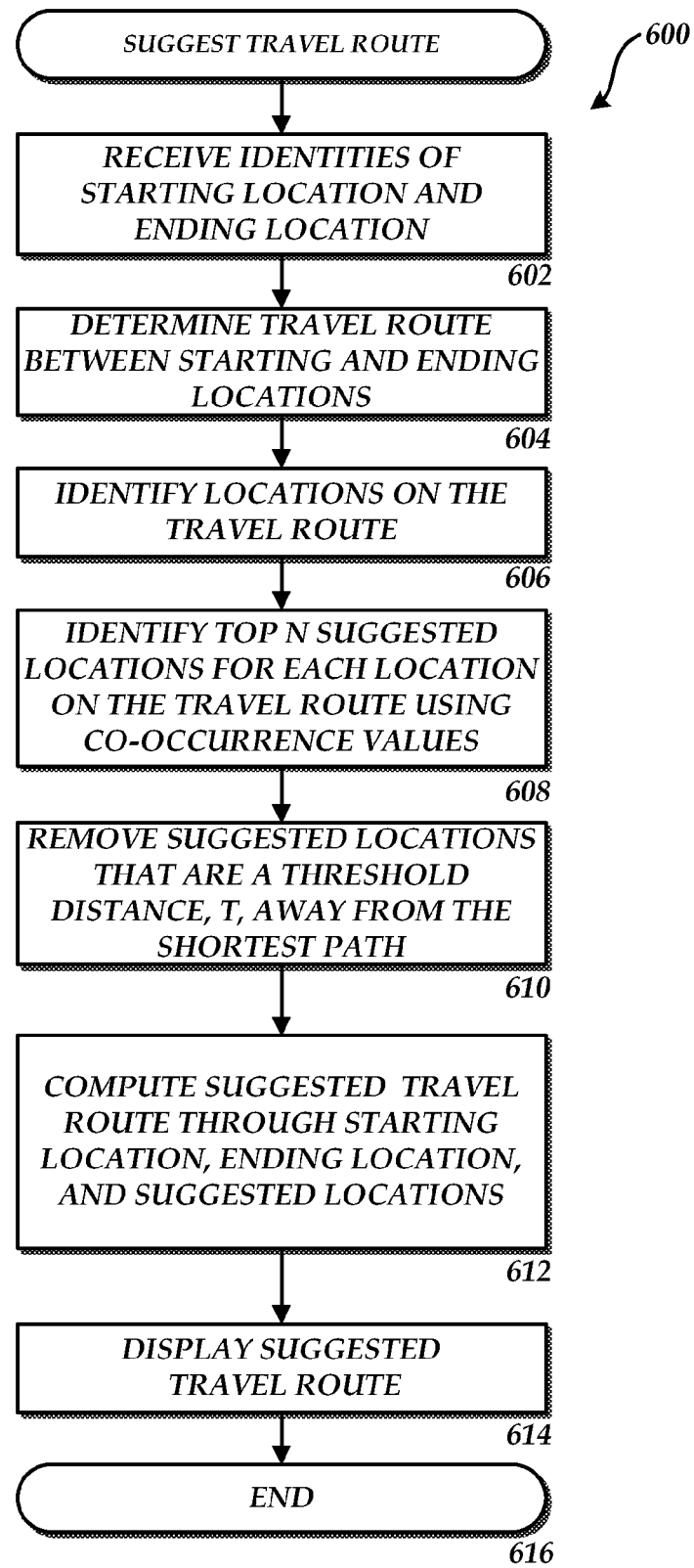
FIG. 6 is a flow diagram showing aspects of one process presented herein for travelogue-based travel route planning according to one embodiment presented herein.
Figure 7A:
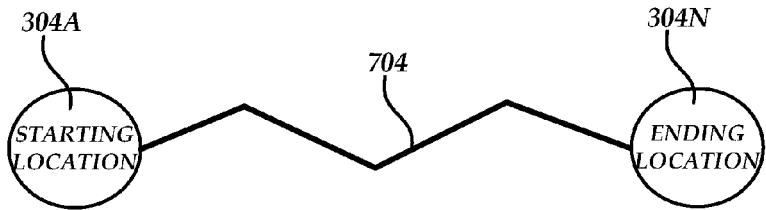
FIGS. 7A-7D are map diagrams showing aspects of a sample travel route that illustrates various aspects of one process presented herein for travelogue-based travel route planning.
Figure 7B:
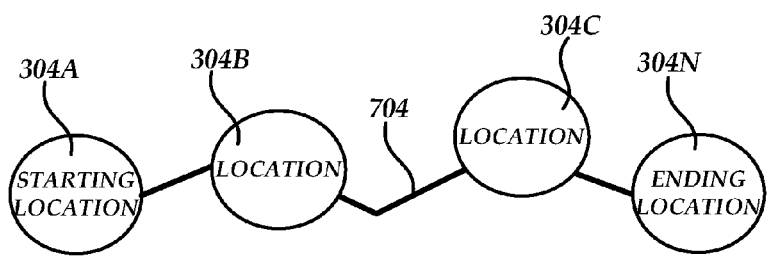
Figure 7C:
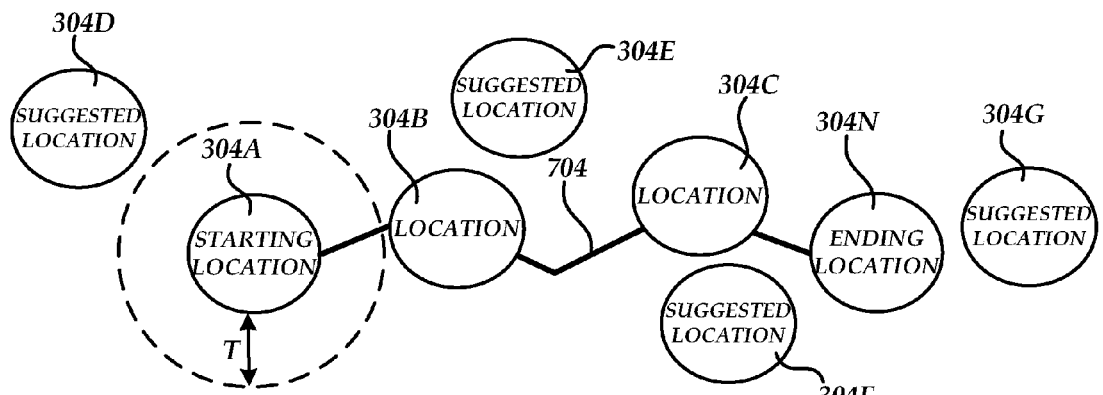
Figure 7D:
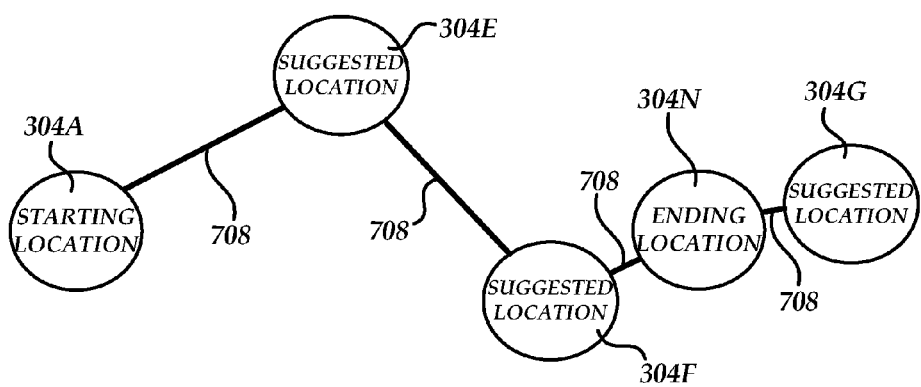

Turning now to FIG. 6, a flow diagram showing aspects of one process presented herein for travelogue-based travel route planning will be described. In particular, FIG. 6 shows a routine 600 that illustrates aspects of the operation of the Web site 112 executing on the server computer 104A. FIG. 6 will be described in conjunction with FIGS. 7A-7D, which are map diagrams showing aspects of a travel route that illustrates features of one process presented herein for travelogue-based travel route planning The routine 600 begins at operation 602 where the Web site 112 receives a request from a user of the client computer 102 to generate a suggested travel route. In particular, according to one implementation, the user provides data identifying a starting location and an ending location for the travel route. In response to receiving such a request, the routine 600 proceeds from operation 602 to operation 604, where the Web site 112 determines one travel route between the starting location and the ending location. For instance, in one embodiment, the Web site 112 performs a shortest path computation to identify the shortest travel route between the starting location and the ending location. Alternately, the Web site 112 may perform a fastest path computation to identify the fastest travel route between the starting location and the ending location. Algorithms for computing the shortest and fastest path between two points are known to those skilled in the art. FIG. 7A illustrates a travel route 704 that has been computed between a starting location 304A and an ending location 304N.

Once the Web site 112 has computed the travel route 704, the routine 600 proceeds to operation 606, where the Web site 112 identifies other locations on the travel route 704. The other locations might be identified using the geographical coordinates of the travel route 704 and a gazetteer that identifies locations by their geographical coordinates. Other mechanisms might also be utilized to identify locations on a travel route. In the example shown in FIG. 7B, the locations 304B and 304C have been identified that are on the travel route 704.

After other locations on the travel route 704 have been identified, the routine 600 proceeds to operation 608. At operation 608, the Web site 112 identifies suggested locations on or near the travel route 704. In particular, the co-occurrence values are utilized to identify popular locations near the starting location 304A, the ending location 304N, and the other locations 304B-304C on the travel route 704. The suggested locations are those locations having a non-zero co-occurrence value with the locations on the travel route 704. In the example shown in FIG. 7C, the suggested locations 304D, 304E, 304F, and 304G have been identified as popular locations that are near other locations on the travel route 704.

Once the suggested locations 304D-304G have been identified, the routine 600 proceeds to operation 610, where the suggested locations 304D-304G are filtered. In one embodiment, the suggested locations 304D-304G are filtered by eliminating those suggested locations 304D-304G from consideration that are more than a predetermined distance, T, away from the travel route 704. In the example shown in FIG. 7C, the suggested location 304D would be filtered out since it is more than the predetermined distance, T, away from the travel route 704. The suggested locations might also be filtered so that only N suggested locations having the highest co-occurrence values are presented to the user.

Once the suggested locations 304E, 304F, and 304G that will be included in the suggested travel route have been identified, the routine 600 proceeds to operation 612. At operation 612, the suggested travel route is computed. The suggested travel route passes through the starting location 304A, the ending location 304N, and the suggested locations 304C, 304F, and 304G. According to one embodiment, a traveling salesman computation is utilized to calculate the suggested travel route. Algorithms for implementing the traveling salesman computation are well known to those skilled in the art. In the example shown in FIG. 7D, a travel route 708 has been computed that passes through the starting location 304A, the suggested locations 304E, 304F, and 304G, and the ending location 304N.

After the suggested travel route 708 has been computed, the routine 600 proceeds to operation 614, where the suggested travel route 708 is displayed to a user of the client computer 102. In one embodiment, the Web site 112 operates in conjunction with the Web browser 108 to cause a map to be displayed that includes the suggested travel route 708. Graphical identifiers for the starting location 304A, the ending location 304N, the suggested locations 304E, 304F, and 304G, and the suggested travel route 708 may be displayed on the map. It should be appreciated that the examples shown in FIGS. 7A-7D are merely illustrative and that more or fewer suggested locations on a travel route 708 might be identified and presented to a user. From operation 614, the routine 600 proceeds to operation 616, where it ends.

It should be appreciated that although the embodiments presented herein are described in the context of a client server implementation utilizing a Web site 112 and a Web browser 108, the functionality presented herein may be implemented in other ways. For instance, according to one implementation, a standalone application program may be utilized to provide the functionality presented herein. Other single computer and multiple computer implementations will also be apparent to those skilled in the art.

Figure 8:
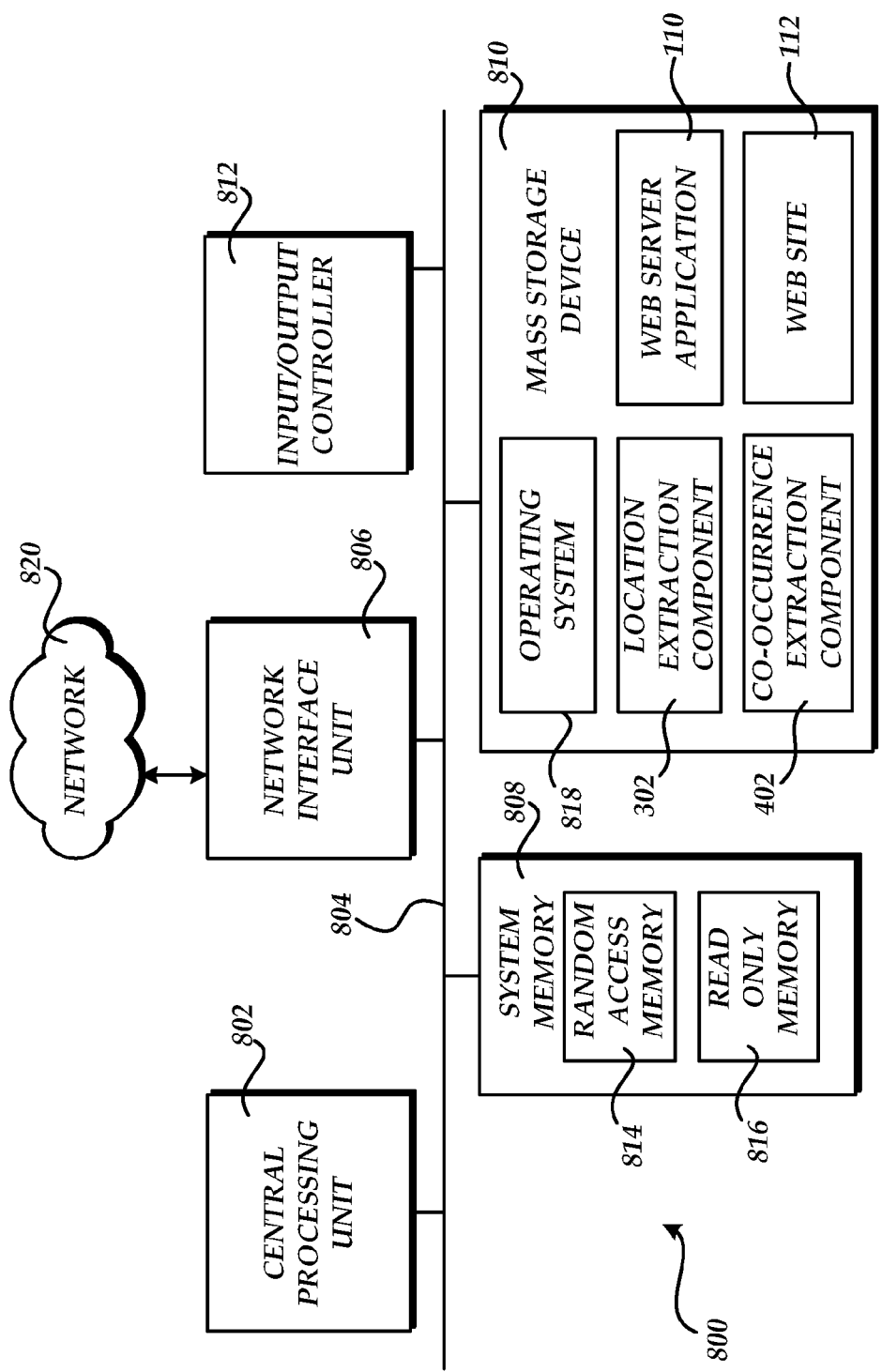
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein for providing travelogue-based travel route planning in the manner presented above. The computer architecture shown in FIG. 8 illustrates a conventional desktop, laptop, or server computer and may be utilized to execute any aspects of the software components presented herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the location extraction component 302, the co-occurrence extraction component 402, the Web server application 110, and the Web site 112, each of which was described in detail above with respect to FIGS. 1-7. The mass storage device 810 and the RAM 814 may also store other types of program modules and data, including the travelogues 204, the locations 304, and the co-occurrence values 404.

It should be appreciated that the software components described herein may, when loaded into the CPU 802 and executed, transform the CPU 802 and the overall computer 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for travelogue-based travel route planning are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for travelogue-based travel route planning, the computer-implemented method comprising performing computer-implemented operations for:
    identifying a plurality of locations in a set of travelogues;
    computing co-occurrence values for the identified locations;
    receiving a request to generate a travel route, the request comprising data identifying a starting location and an ending location; and
    in response to receiving the request to generate the travel route, determining a first travel route between the starting location and the ending location, identifying one or more suggested locations on or near the first travel route using the co-occurrence values, determining a second travel route passing through the starting location, the ending location, and the suggested locations, and causing the second travel route to be displayed.

2. The computer-implemented method of claim 1, wherein each travelogue comprises a text description of an experience with a location.

3. The computer-implemented method of claim 2, wherein each co-occurrence value comprises an integer value specifying the number of times a first location and a second location are mentioned within the same travelogue for travelogues within the set of travelogues.

4. The computer-implemented method of claim 3, wherein determining a first travel route comprises performing a shortest path computation between the starting location and the ending location to identify the first travel route.

5. The computer-implemented method of claim 3, wherein determining a first travel route comprises performing a fastest path computation between the starting location and the ending location to identify the first travel route.

6. The computer-implemented method of claim 3, wherein identifying one or more suggested locations on or near the first travel route using the co-occurrence values comprises:
   identifying one or more locations on the first travel route; and
   for each location identified on the first travel route, identifying one or more suggested locations, each of the suggested locations having a non-zero co-occurrence value with a location identified on the first travel route.

7. The computer-implemented method of claim 6, wherein identifying one or more suggested locations on or near the first travel route using the co-occurrence values further comprises filtering the identified suggested locations that are more than a threshold distance away from the first travel route.

8. The computer-implemented method of claim 7, wherein the second travel route passing through the starting location, the ending location, and the suggested locations is computed using a traveling salesman algorithm.

9. The computer-implemented method of claim 7, wherein causing the second travel route to be displayed comprises causing a map to be displayed, the map showing the starting location, the ending location, the suggested locations, and the second travel route.

10. A computer-readable storage medium having computer-readable instructions stored thereupon which, when executed by a computer, cause the computer to:
   store one or more travelogues;
   execute a location extraction component to identify one or more locations within the travelogues;
   execute a co-occurrence extraction component to compute co-occurrence values for pairs of locations identified within the travelogues;
   receive a request to generate a travel route, the request comprising data identifying a starting location and an ending location; and
   in response to receiving the request to generate the travel route, to determine a first travel route between the starting location and the ending location, to identify one or more suggested locations on or near the first travel route using the co-occurrence values, to determine a second travel route passing through the starting location, the ending location, and the suggested locations, and to cause the second travel route to be displayed.

11. The computer-readable storage medium of claim 10, wherein each co-occurrence value comprises an integer value specifying the number of times a first location and a second location are mentioned within the same travelogue for travelogues within the set of travelogues.

12. The computer-readable storage medium of claim 11, wherein each travelogue comprises a text description of an experience with a location.

13. The computer-readable storage medium of claim 12, wherein determine a first travel route comprises performing a shortest path computation between the starting location and the ending location to identify the first travel route.

14. The computer-readable storage medium of claim 12, wherein determine a first travel route comprises performing a fastest path computation between the starting location and the ending location to identify the first travel route.

15. The computer-readable storage medium of claim 12, wherein determine a second travel route comprises performing a traveling salesman algorithm to determine the second travel route passing through the starting location, the ending location, and the suggested locations.

16. The computer-readable storage medium of claim 15, wherein identify one or more suggested locations on or near the first travel route using the co-occurrence values comprises:
   identifying one or more locations on the first travel route; and
   for each location identified on the first travel route, identifying one or more suggested locations, each of the suggested locations having a non-zero co-occurrence value with a location identified on the first travel route.

17. The computer-readable storage medium of claim 16, wherein identify one or more suggested locations on or near the first travel route using the co-occurrence values further comprises filtering the identified suggested locations that are more than a threshold distance away from the first travel route.

18. The computer-readable storage medium of claim 17, wherein cause the second travel route to be displayed comprises causing a map to be displayed, the map showing the starting location, the ending location, the suggested locations, and the second travel route.

19. A computer-implemented method for travelogue-based travel route planning, the computer-implemented method comprising performing computer-implemented operations for:
   storing one or more travelogues, each of the travelogues comprising a text description of an experience with a location;
   executing a location extraction component configured to identify one or more locations within the travelogues;
   executing a co-occurrence extraction component configured to compute co-occurrence values for pairs of locations identified within the travelogues, each of the co-occurrence values comprising an integer specifying the number of times a pair of locations are mentioned within the same travelogue for all of the travelogues;
   receiving a request to generate a travel route, the request comprising data identifying a starting location and an ending location; and
   in response to receiving the request to generate the travel route,
   to determine a first travel route between the starting location and the ending location, to identify one or more locations on the first travel route and for each location identified on the first travel route, identifying one or more suggested locations, each of the suggested locations having a non-zero co-occurrence value with a location identified on the first travel route, to determine a second travel route passing through the starting location, the ending location, and the suggested locations, and to cause the second travel route to be displayed.

20. The computer-implemented method of claim 19, wherein suggested locations that are more than a threshold distance away from the first travel route are removed from the second travel route, wherein the first travel route is computed using a shortest path algorithm, wherein the second travel route is computed using a traveling salesman algorithm, and wherein cause the second travel route to be displayed comprises causing a map to be displayed, the map showing the starting location, the ending location, the suggested locations, and the second travel route.

* * * * *